Aug. 15, 1950  W. G. KASSNER  2,518,791
GAUGE DEVICE FOR USE WITH A PRESS
Filed April 6, 1949  2 Sheets-Sheet 1

INVENTOR.
William G. Kassner
BY
Barnes, Kisselle, Laughlin & Raisch
ATTORNEYS.

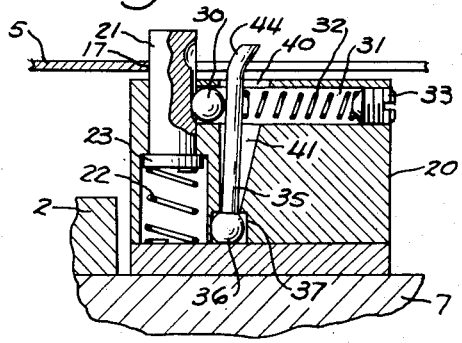
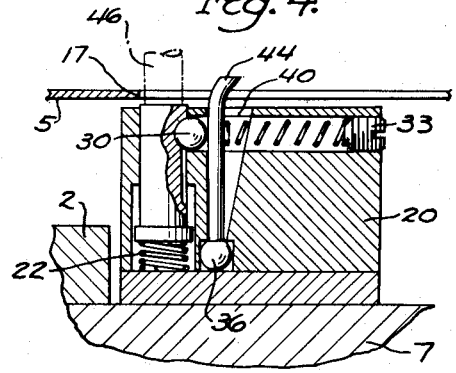
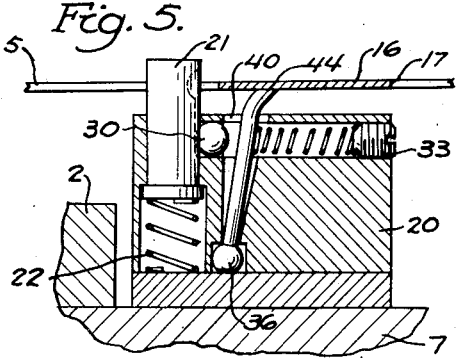
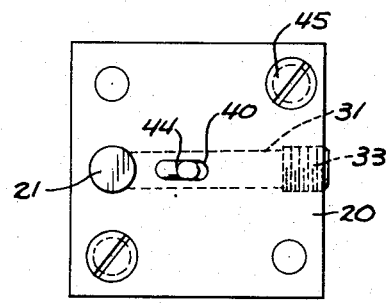
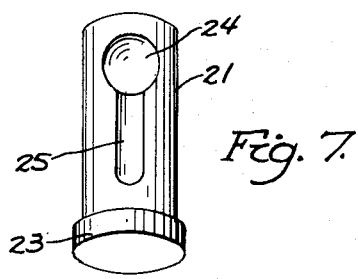
INVENTOR.
William G. Kassner

Patented Aug. 15, 1950

2,518,791

UNITED STATES PATENT OFFICE 2,518,791

GAUGE DEVICE FOR USE WITH A PRESS

William G. Kassner, Pontiac, Mich.

Application April 6, 1949, Serial No. 85,883

7 Claims. (Cl. 164—59)

Briefly, this invention has to do with a gauge device for use with a press, that is, a machine which may be termed a punch press, which strikes out shapes from sheet stock such as sheet metal. The object of the invention is to provide a gauge which will locate the work piece as the work piece is advanced but which is so arranged that the work piece may be advanced without the necessity of lifting or otherwise shifting the work piece to pass it over the gauge.

The invention can be disclosed by considering it used with a punch press which blanks out metal shapes from an elongated strip or sheet of metal, wherein openings are formed in the sheet as the shapes are stamped therefrom with intervening pieces or strips of the sheet. The remaining piece or strip is abutted against a gauge pin for locating the work piece for the stamping operation. And, in the stamping operation the gauge pin is retracted so that the work piece may be advanced with lengthwise movement and without lateral movement or lifting thereof. This movement, however, of the strip resets the gauge pin so that it may locate the work in the next subsequent advance thereof. While the invention is disclosed as used with such a punch press, it may find use in other similar machines.

The invention is disclosed in the accompanying drawings wherein:

Fig. 3 is a sectional view taken through the gauge device showing the same in gauging position.

Fig. 4 is a view illustrating the retracted position of the gauging element.

Fig. 5 is a view illustrating how the work piece trips the gauge to reset it.

Fig. 6 is a plan view of the gauge device.

Fig. 7 is an enlarged view in perspective showing the pin.

Figure 1:
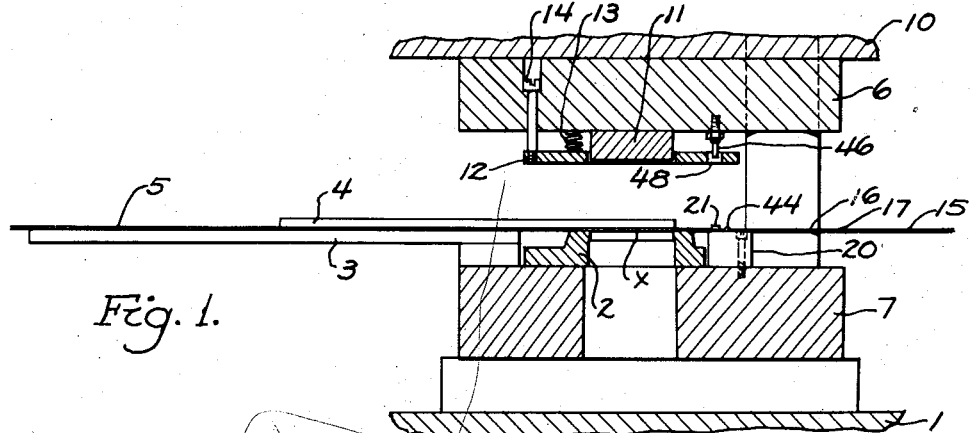
Fig. 1 is a view largely in cross section illustrating elements of the machine, such as the bed, the ram, the punch and die, and showing the gauge device.

In Fig. 1, the bed of a machine, such as a press or punch press, is shown at 1, the same being equipped with a die 2, through the means of a lower die shoe 7 and with supporting means 3 and guide means 4 for a work piece in the form of a strip or sheet of metal, as shown at 5.

The ram of the press is illustrated at 10 and it is provided with a punch 11 through the means of a top die shoe 6 and a stripper 12. The stripper is backed by springs 13 and it is held by a suitable number of screws 14. This represents conventional machine construction. Suffice it to say, the ram 10 moves toward the bed 1 and the punch 11 enters the die 2 and cuts out a metal shape from the work piece. As the ram 10 elevates as Fig. 1 is viewed, the spring pressed stripper 12 strips the work from the punch 11.

Figure 2:
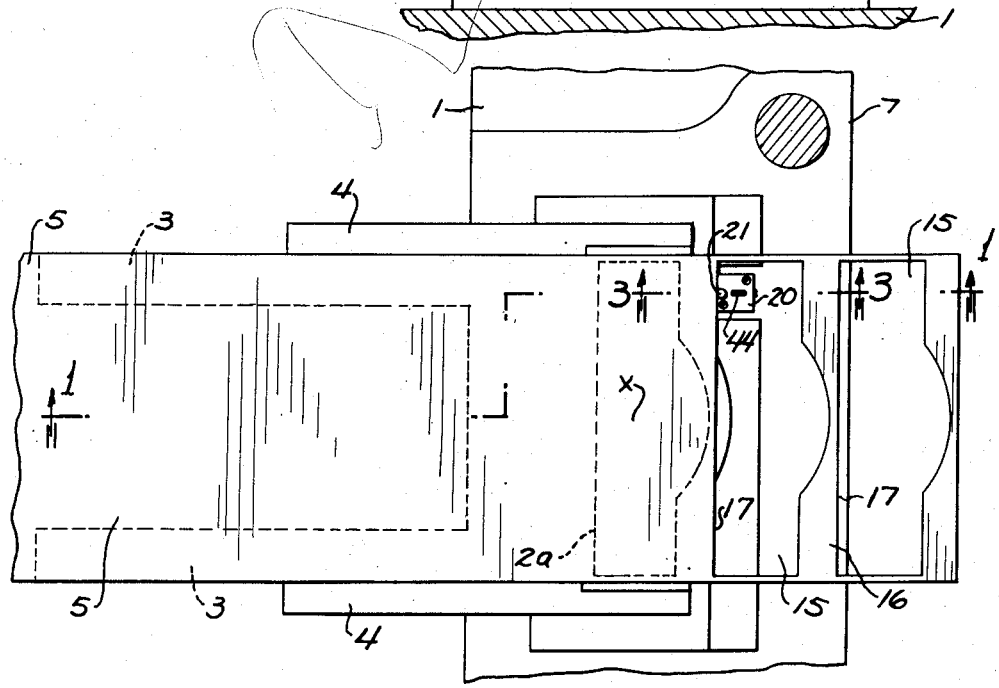
Fig. 2 is a plan view showing a work piece with the shapes stamped therefrom.

As shown in Fig. 2, the strip 5 has two openings or holes therethrough, as at 15, these being the result of shapes which are struck out therefrom and waste cross pieces or strips 16 remain between the openings 15. Each waste piece has a leading edge 17, considering that the work piece is advanced from left to right, as Fig. 2 is viewed. Also considering Fig. 2, the work piece is in a position to have a shape struck therefrom, this being indicated at $x$ and defined by the opening in the die represented by the dotted line 2a. It will be noted that the portion of the metal which is about to become a waste strip 16 lies just forward of the area $x$ and that this portion of the metal has a leading edge 17. In some forms of work the waste pieces may not extend completely across the openings.

The gauge device, having a body generally indicated at 20 is attached on the shoe 7, as shown in Figs. 1 and 2. This gauge device, as will be seen by reference to Figs. 3, 4 and 5, has a gauge pin 21 mounted in a bore in the body so that it may slidably shift in an up and down direction which may preferably be a true vertical action. The pin is normally projected upwardly by a coil spring 22. The bore has an intermediate shoulder engageable by the head 23 so that the upward movement of the gauge pin is thus determined. The gauge pin is provided with partially spherical recess 24 and preferably provided with a groove 25 connecting therewith.

A detent preferably in the form of a ball 30 is mounted in a bore 31 and acted upon by a spring 32 held in the bore by a plug 33. This ball cooperates with the groove 25 and detent recess 24. A tripping pin or trigger 35 is mounted for oscillating movement, for which purpose it may have an enlarged ball shaped end 36 rockably situated in a socket 37. This trigger is positioned to lie between the ball and the spring 32 and its upper end projects through an elongated slot 40 in the gauge body. The gauge body is chambered as at 41 to permit of movement of the trigger and the upper end of the trigger is preferably fashioned to provide an inclined face 44 which faces the oncoming work piece.

The gauge body is attached to the bed of the press by suitable cap screws 45.

Attached to the top shoe 6 is a finger or pin 46 and the stripper 12 may be provided with an aperture 48 for accommodating the pin 46.

The gauge device is attached to the press in a position so that when a leading edge 17 is advanced from left to right, as Fig. 2 is viewed, and strikes the gauge pin 21, the work piece is properly positioned for an operation thereon. The pin or projection 46 is attached to the ram so that as the ram approaches the bed of the press the pin 46 strikes the top of the gauge pin 21 and depresses it against the action of the spring 22.

In the operation of the device, we may first consider that the ram of the press, the work piece, and the gauge are all in the position, as shown in Figs. 1, 2, and 3. At this time, the leading edge 17 just ahead of the area x strikes the pin 21 and the work piece is thus properly positioned. As the ram descends, the shape x is struck from the work piece and the pin 46 depresses the gauge pin 21 to the position shown in Fig. 4. The ball detent, under the action of the spring 21, is projected into the recess 24 and thus the gauge pin is held telescoped into the gauge body and it is, therefore, out of the way and depressed below the work piece. The ram ascends back to the position shown in Fig. 1, the work piece is free to be pushed forwardly and it does not have to be elevated or lifted over the gauge pin. As the work piece is advanced, the leading edge 17 strikes the trigger and shifts it to a position as indicated in Fig. 5. The waste section 16 may slide up and over the trigger with the leading edge 17 functioning on the inclined face 44 which is the position shown in Fig. 5. Of course, the advancing movement is fairly rapid and the waste strip 16 may be completely beyond the location of the gauge pin when the gauge pin is again projected upwardly by its spring. The parts are so arranged that a fairly light press of the leading edge 17 against the trigger is adequate for swinging the trigger against the action of the spring 32 sufficient to release the ball detent from its recess so that the gauge pin may be projected to gauging position. Indeed, the situation may be one where the trigger is shifted just enough to relieve some of the pressure of the spring 32 whereupon the spring 22 rather forcibly projects the gauge pin and aids in further retraction of the trigger to the Fig. 5 position. The ball serves as a keg for the gauge pin for keeping it from rotating on its own axis inasmuch as the balls ride in the groove 25. As the work piece advances, the newly formed leading edge 17, which forms the rear boundary of the hole which results from the last blanking operation, strikes the pin 21 and thus locates the work for the next operation.

Accordingly, it will be observed that each time the press operates, the gauge pin is depressed allowing for feeding movement of the work piece and the feeding movement actuates the trigger so that the gauge pin is reset to engage the on-coming newly formed leading edge 17. The operator or operators are not obliged to lift the work piece over the gauge pin and thus the machine provides for considerable facility and ease in operation and makes it possible to step up the rate of production while eliminating the rather undesirable and inartful time consuming step of lifting the work piece over the gauge pin.

I claim:

1. A gauge device for use with a press or the like having a bed and a ram with a die and a punch for blanking out shapes from a sheet stock work piece leaving holes in the work piece with intervening waste pieces, a body adapted to be secured to the bed, a gauge element movably mounted in the body, yieldable means for projecting the gauge element to gauging position in the path of and to be engaged by the leading edge of a waste piece, to thereby position the work piece, means on the ram for shifting the gauge element out of gauging position as the ram approaches the bed, detent means for holding the gauge element out of gauging position, whereby the work piece may be advanced with the waste piece moving over the gauging element and trigger means engageable by the leading edge of the waste piece as the work piece is advanced for releasing the detent means for movement of the gauge element to gauging position.

2. A gauge device for use with a press or the like having a bed and a ram with a die and a punch for blanking out shapes from a sheet stock work piece leaving holes in the work piece with intervening waste pieces, a body adapted to be secured to the bed, a gauge pin slidably mounted in the body, spring means normally projecting the gauge pin to gauging position in the path of and to be engaged by the leading edge of a waste piece, to thereby position the work piece, means on the ram for shifting the gauge pin out of gauging position when the ram approaches the bed, detent means for holding the gauge pin out of gauging position, whereby the work piece may be advanced over the gauge pin and trigger means engageable by the leading edge of a waste piece for releasing the detent means.

3. A gauge device for use with a press or the like having a bed and a ram with a die and a punch for blanking out shapes from a sheet stock work piece leaving holes in the work piece with intervening waste pieces, a body adapted to be secured to the bed, a gauge pin slidably mounted in the body, spring means for projecting the gauge pin to gauging position in the path of and to be engaged by the leading edge of a waste piece, to thereby position the work piece, means on the ram for engaging the gauge pin and shifting it slidably into the body and out of gauging position, a spring pressed detent for holding the gauge pin out of gauging position, whereby the work piece may be advanced and passed over the gauge pin, and trigger means located downstream from the gauge pin and engageable by the leading edge of a waste piece to release the detent, whereby it is projected to gauging position by said spring means.

4. A gauge device substantially as described comprising, a body, a gauge element movably mounted in the body, yieldable means for projecting the gauge element from the body to gauging position, where it is adapted to engage a leading edge of an advancing work piece to position the same, the gauge element adapted to be shifted out of gauging position and into the body, detent means for holding the gauge element out of gauging position and trigger means positioned at one side of the gauge element, said trigger means being engageable by a leading edge of the work pieces as it advances to release the detent means.

5. A gauge device substantially as described comprising, a body, a gauge pin slidably mounted therein, spring means for projecting the gauge pin from the body to gauging position, so that one face thereof is adapted to engage a leading edge of an advancing work piece, the gauge pin adapted to be telescoped into the body so that it is out of gauging position so that a work piece may be passed thereover, a spring pressed detent in the body for holding the gauge pin out of gauging position and trigger means positioned adjacent the gauge pin and having a portion lying in the path of the work piece as it is advanced to be engaged and actuated thereby to release the detent.

6. A gauge device substantially as described comprising a body, a gauge pin slidably mounted therein, spring means for projecting the gauge pin from the body to gauging position, so that one face thereof is adapted to engage a leading edge of an advancing work piece, the gauge pin adapted to be telescoped into the body so that it is out of gauging position so that a work piece may be passed thereover, a spring pressed ball detent in the body for holding the gauge pin out of gauging position, and trigger means positioned adjacent the gauge pin and having a portion lying in the path of the work piece as it is advanced to be engaged and actuated thereby to release the detent.

7. In combination with a machine having a bed and a ram provided with a die and a punch for blanking out shapes from a sheet stock work piece, thereby leaving holes in the work piece, a gauge device comprising a body mounted on the bed, a spring pressed gauge element movably mounted in the body and normally projected to gauging position and adapted to engage a leading edge of the work piece to position the same, means on the ram for engaging the gauge element and shifting it into the body and out of gauging position, a spring pressed detent for holding the gauge element out of gauging position, whereby the work piece may be advanced, and trigger means positioned downstream from the gauge element with respect to the direction of movement of the work piece having a part positioned in the path of a leading edge of the work piece so as to be engaged and actuated thereby to release the detent for the projection of the gauge element to gauging position.

WILLIAM G. KASSNER.

No references cited.